US012719737B2

(12) United States Patent
Doddi et al.

(10) Patent No.: US 12,719,737 B2
(45) Date of Patent: Aug. 25, 2026

(54) METHODS, SYSTEMS, AND COMPUTER READABLE MEDIA FOR SUPPRESSING SUBSCRIPTION NOTIFICATIONS TO RESOURCE UPDATE ORIGINATORS

(71) Applicant: Oracle International Corporation, Redwood Shores, CA (US)

(72) Inventors: Srikar Doddi, Bangalore (IN); Pavani Chirala, Sadananda Nagar (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 147 days.

(21) Appl. No.: 18/826,057

(22) Filed: Sep. 5, 2024

(65) Prior Publication Data

US 2026/0067153 A1 Mar. 5, 2026

(51) Int. Cl.
*H04L 41/0604* (2022.01)
*H04L 61/4511* (2022.01)

(52) U.S. Cl.
CPC ...... *H04L 41/0627* (2013.01); *H04L 61/4511* (2022.05)

(58) Field of Classification Search
None
See application file for complete search history.

(56) References Cited

U.S. PATENT DOCUMENTS

2014/0129618 A1* 5/2014 Panje ............... H04N 21/26291 709/203
2023/0199868 A1* 6/2023 Kedalagudde ........ H04L 67/141 370/328
2024/0155393 A1* 5/2024 Han ...................... H04W 24/10

OTHER PUBLICATIONS

Danish et al., "PushNotify: Push server application", May 31, 2013, IEEE, 2013 3rd IEEE International Advance Computing Conference (IACC) (2013, pp. 377-382) (Year: 2013).*
3rd Generation Partnership Project; Technical Specification Group Core Network and Terminals; 5G System; Usage of the Unified Data Repository service for Policy Data, Application Data, and Structured Data for Exposure; Stage 3 (Release 18) 3GPP TS 29.519 V18.6.0 (Jun. 2024).

(Continued)

*Primary Examiner* — Davoud A Zand
(74) *Attorney, Agent, or Firm* — Jenkins, Taylor & Hunt, P.A.

(57) ABSTRACT

A method for suppressing subscription notifications to resource update originators includes receiving, by a producer NF and from a first consumer NF, a subscription request message requesting to be notified of changes in a resource. The method further includes creating, by the producer NF in a subscription database, and in response to the subscription request message from the first consumer NF, a record including a resource identifier, a notification URI, and information identifying the first consumer NF. The method further includes receiving, by the producer NF and from a resource update originator, a resource update request message for updating the resource. The method further includes suppressing transmission of a subscription notification request message concerning the resource to a notification URI in a subscription database record when the resource update originator identifying information obtained from the resource update request message matches the information identifying the consumer NF in the database record.

20 Claims, 6 Drawing Sheets

(56) References Cited

OTHER PUBLICATIONS

3rd Generation Partnership Project; Technical Specification Group Core Network and Terminals; 5G System; Network Function Repository Services; Stage 3 (Release 18) 3GPP TS 29.510 V18.7.0 (Jun. 2024).
3rd Generation Partnership Project; Technical Specification Group Core Network and Terminals; 5G System; Principles and Guidelines for Services Definition; Stage 3 (Release 18) 3GPP TS 29.501 V18.5.0 (Jun. 2024).
3rd Generation Partnership Project; Technical Specification Group Core Network and Terminals; 5G System; Technical Realization of Service Based Architecture; Stage 3 (Release 18) 3GPP TS 29.500 V18.6.0 (Jun. 2024).
3rd Generation Partnership Project; Technical Specification Group Services and System Aspects; System architecture for the 5G System (5GS); Stage 2 (Release 19) 3GPP TS 23.501 V19.0.0 (Jun. 2024).
3rd Generation Partnership Project; Technical Specification Group Services and System Aspects; Procedures for the 5G System (5GS); Stage 2 (Release 18) 3GPP TS 23.502 V18.6.0 (Jun. 2024).

* cited by examiner

| Subscriber Key | Subscription Info | User-agent Info |
| --- | --- | --- |
| msisdn-11111111 | {notificationUri: pcf1.igw.com, resource: sm-data } | NFInstanceId 1 |
| msisdn-11111111 | {notificationUri: pcf2.igw.com, resource: sm-data } | NFInstanceId 2 |

METHODS, SYSTEMS, AND COMPUTER READABLE MEDIA FOR SUPPRESSING SUBSCRIPTION NOTIFICATIONS TO RESOURCE UPDATE ORIGINATORS

TECHNICAL FIELD

The subject matter described herein relates to subscriptions and notifications in communications networks. More particularly, the subject matter described herein relates to methods, systems, and computer readable media for suppressing subscription notifications to resource update originators.

BACKGROUND

In 5G telecommunications networks, a network function that provides service is referred to as a producer network function (NF) or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name (FQDN) that resolves to an IP address and port number on a network node that hosts a producer NF. An NF instance is an instance of a producer NF that provides one or more services. A given producer NF may include more than one NF instance. It should also be noted that multiple NF instances can share the same service endpoint.

NFs register with an NF repository function (NRF). The NRF maintains profiles of available NF instances identifying the services supported by each NF instance. The profile of an NF instance is referred to in 3GPP TS 29.510 as an NF profile. NF instances can obtain information about other NF instances that have registered with the NRF through the NF discovery service operation. According to the NF discovery service operation, a consumer NF sends an NF discovery request to the NRF. The NF discovery request includes query parameters that the NRF uses to locate the NF profiles of producer NFs capable of providing the service identified by the query parameters. NF profiles are data structures that define the types of services provided by an NF instance as well as contact and capacity information regarding the NF instance.

SCPs route messages between producer NF instances. An SCP can also invoke the NF discovery service operation to learn about available producer NF instances. The case where the SCP uses the NF discovery service operation to obtain information about producer NF instances on behalf of consumer NFs is referred to as delegated discovery. Consumer NFs connect to the SCP, and the SCP load balances traffic among producer NF service instances that provide the required services or directly routes the traffic to the destination producer NF instance.

One issue that can arise in 5G, previous generation, and subsequent generation networks is that NF service producers may send unnecessary subscription notification request messages to originators of resource update messages. For example, the 5G service-based interface (SBI) network supports two types of interactions between the NF service consumer and the NF service producer: 1) request-response; and 2) subscribe-notify (3GPP TS 23.501 Clause 7.1.2). 3GPP does not define a mechanism to suppress the notifications when an NF consumer subscribes for notifications of updates to certain resources but the same NF consumer issues a HTTP request with Modify (Put/Patch/Post) operations on the subscribed resources. The messages transmitted by the NF service consumer to create a subscription to a resource that resides on a producer NF are referred to herein as subscription request messages. The update messages transmitted from the NF service consumer to a producer NF to update a resource are referred to herein as resource update request messages.

In one example, a policy control function (PCF) may subscribe to receive notification data when a from a unified repository (UDR) SessionManagementPolicyData resource is updated using a PolicyDataSubscriptions request. Later, the same subscribing PCF instance updates this resource by sending a request to the UDR to modify the SessionManagementPolicyData resource. The UDR modifies the resource and sends notification request messages to all subscribing NFs. In this case, the notification is still sent to the PCF instance which is the originator of the resource update request. The UDR/NF service producer is unable to distinguish if the originator of the resource update request message is same entity as the notification receiver because the identifier used for the notification receiver in the notification uniform resource identifier (URI) of the subscription request message and the originating Internet protocol (IP) address or fully qualified domain name (FQDN) of the resource update request message may not match due to the use of different gateways of the PCF in cloud network deployments. The sending of unnecessary subscription notification request messages to resource update originators not only leads to increased network traffic but also requires additional logic on the NF consumer to identify and discard such notifications.

Accordingly, in light of these and other difficulties, there exists a need for improved methods, systems, and computer readable media for suppressing subscription notifications to resource update originators.

SUMMARY

A method for suppressing subscription notifications to resource update originators includes receiving, by a producer network function (NF) and from a first consumer NF, a subscription request message requesting to be notified of changes in a resource. The method further includes creating, by the producer NF in a subscription database, and in response to the subscription request message from the first consumer NF, a record including a resource identifier, a notification uniform resource identifier (URI), and information identifying the first consumer NF. The method further includes receiving, by the producer NF and from a resource update originator, a resource update request message for updating the resource. The method further includes accessing, by the producer NF and using a resource identifier from the resource update request message, the subscription database, locating at least one record including a resource identifier that matches the resource identifier from the resource update request message and comparing resource update originator identifying information from the resource update request message to information identifying a consumer NF in the at least one record. The method further includes suppressing transmission of a subscription notification request message concerning the resource to a notification URI in the at least one record when the resource update originator identifying information obtained from the resource update request message matches the information identifying the consumer NF in the at least one record.

According to another aspect of the subject matter described herein, creating the record including the information identifying the first consumer NF includes reading an NF instance identifier of the first consumer NF from a user-agent header of the resource update request message and storing the NF instance identifier of the first consumer NF in the record.

According to another aspect of the subject matter described herein, locating at least one record includes locating the record created in response to the subscription request message from the first consumer NF.

According to another aspect of the subject matter described herein, comparing the resource update originator identifying information from the resource update request message to the information identifying the consumer NF from the at least one record includes comparing an NF instance identifier of the resource update originator read from a user-agent header of the resource update request message to the NF instance identifier of the first consumer NF stored in the record.

According to another aspect of the subject matter described herein, suppressing transmission of the subscription notification request message concerning the resource to the resource update originator includes suppressing the transmission of the subscription notification request message to the resource update originator when the NF instance identifier of the resource update originator read from the user-agent header of the resource update request message matches the NF instance identifier of the first consumer NF stored in the record.

According to another aspect of the subject matter described herein, the method for suppressing subscription notifications to resource update originators includes receiving, by the producer NF and from a second consumer NF, a subscription request message requesting to be notified of changes in the resource, creating, by the producer NF, in the subscription database, and in response to the subscription request message from the second consumer NF, a record including the resource identifier, a notification URI, and information identifying the second consumer NF.

According to another aspect of the subject matter described herein, locating at least one record includes locating the record that was created in response to the subscription request message from the second consumer NF and comparing the resource update originator identifying information from the resource update request message to the information identifying the consumer NF from the at least one record includes comparing an NF instance identifier of the resource update originator read from a user-agent header of the resource update request message to the NF instance identifier of the second consumer NF stored in the record created in response to the subscription request message from the second consumer NF.

According to another aspect of the subject matter described herein, the method for suppressing transmission of subscription notifications to resource update originators includes transmitting the subscription notification request message to the notification URI in the record created in response to the subscription request message from the second consumer NF when the NF instance identifier read from the user-agent header of the subscription update request message does not match the NF instance identifier of the second consumer NF stored in the record created in response to the subscription request message from the second consumer NF.

According to another aspect of the subject matter described herein, the notification URI in the record created in response to the subscription request message from the first consumer NF identifies a notification target of the first consumer NF having a different Internet protocol (IP) address or fully qualified domain name (FQDN) from an IP address or an FQDN of the resource update originator.

According to another aspect of the subject matter described herein, the notification target comprises an ingress gateway of the first consumer NF and the resource update originator comprises an egress gateway of the first consumer NF.

According to another aspect of the subject matter described herein, a system for suppressing subscription notifications to resource update originators includes a producer network function including at least one processor and a memory. The method further includes a subscription manager implemented by the at least one processor for receiving, from a first consumer NF, a subscription request message requesting to be notified of changes in a resource, creating, in a subscription database, and in response to the subscription request message from the first consumer NF, a record including a resource identifier, a notification uniform resource identifier (URI), and information identifying the first consumer NF, receiving, from a resource update originator, a resource update request message for updating the resource, accessing, using a resource identifier from the resource update request message, the subscription database, locating at least one record including a resource identifier that matches the resource identifier from the resource update request message and comparing resource update originator identifying information from the resource update request message to information identifying a consumer NF in the at least one record, and suppressing transmission of a subscription notification request message concerning the resource to a notification URI in the at least one record when the resource update originator identifying information obtained from the resource update request message matches the information identifying the consumer NF in the at least one record.

According to another aspect of the subject matter described herein, the subscription manager is configured to create the record including the information identifying the first consumer NF by reading an NF instance identifier of the first consumer NF from a user-agent header of the resource update request message and storing the NF instance identifier of the first consumer NF in the record.

According to another aspect of the subject matter described herein, the subscription manager is configured to locate the record created in response to the subscription request message from the first consumer NF.

According to another aspect of the subject matter described herein, the subscription manager is configured to compare the resource update originator identifying information from the resource update request message to the information identifying the consumer NF from the at least one record by comparing an NF instance identifier of the resource update originator read from a user-agent header of the resource update request message to the NF instance identifier of the first consumer NF stored in the record.

According to another aspect of the subject matter described herein, the subscription manager is configured to suppress transmission of the subscription notification request message concerning the resource to the resource update originator by suppressing the transmission of the subscription notification request message to the resource update originator when the NF instance identifier of the resource update originator read from the user-agent header of the resource update request message matches the NF instance identifier of the first consumer NF stored in the record.

According to another aspect of the subject matter described herein, the subscription manager is configured to receive, from a second consumer NF, a subscription request message requesting to be notified of changes in the resource and create, in the subscription database and in response to the subscription request message from the second consumer NF, a record including the resource identifier, a notification URI, and information identifying the second consumer NF.

According to another aspect of the subject matter described herein, the subscription manager is configured to locate the record created in response to the subscription request message from the second consumer NF and compare the resource update originator identifying information from the resource update request message to the information identifying the consumer NF from the at least one record includes comparing an NF instance identifier of the resource update originator read from a user-agent header of the resource update request message to the NF instance identifier of the second consumer NF stored in the record created in response to the subscription request message from the second consumer NF.

According to another aspect of the subject matter described herein, the subscription manager is configured to transmit the subscription notification request message to the notification URI in the record created in response to the subscription request message from the second consumer NF when the NF instance identifier read from the user-agent header of the subscription update request message does not match the NF instance identifier of the second consumer NF stored in the record created in response to the subscription request message from the second consumer NF.

According to another aspect of the subject matter described herein, the notification URI in the record created in response to the subscription request message from the first consumer NF identifies a notification target of the first consumer NF having a different Internet protocol (IP) address or fully qualified domain name (FQDN) from an IP address or an FQDN of the resource update originator, the notification target comprises an ingress gateway of the first consumer NF, and the resource update originator comprises an egress gateway of the first consumer NF.

According to another aspect of the subject matter described herein, a non-transitory computer readable medium having stored thereon executable instructions that when executed by a processor of a computer control the computer to perform steps is provided. The steps include receiving, by a producer network function (NF) and from a first consumer NF, a subscription request message requesting to be notified of changes in a resource. The steps further include creating, by the producer NF in a subscription database, and in response to the subscription request message from the first consumer NF, a record including a resource identifier, a notification uniform resource identifier (URI), and information identifying the first consumer NF. The steps further include receiving, by the producer NF and from a resource update originator, a resource update request message for updating the resource. The steps further include accessing, by the producer NF and using a resource identifier from the resource update request message, the subscription database, locating at least one record including a resource identifier that matches the resource identifier from the resource update request message and comparing resource update originator identifying information from the resource update request message to information identifying a consumer NF in the at least one record. The steps further include suppressing transmission of a subscription notification request message concerning the resource to a notification URI in the at least one record when the resource update originator identifying information obtained from the resource update request message matches the information identifying the consumer NF in the at least one record.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
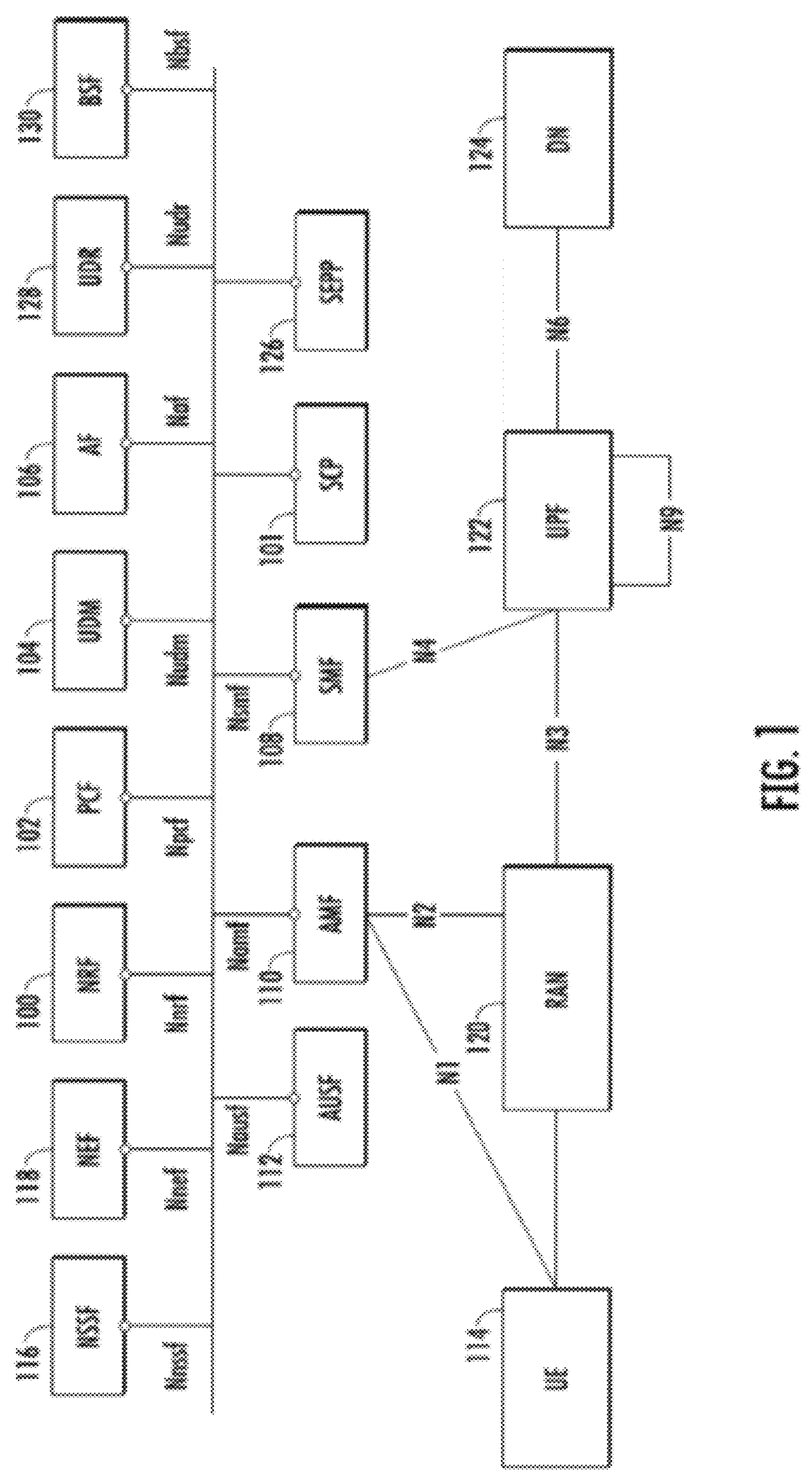
FIG. 1 is a network diagram illustrating an exemplary 5G system network architecture.

FIG. 1 is a network diagram illustrating an exemplary 5G system network architecture. The architecture in FIG. 1 includes NRF 100 and SCP 101, which may be located in the same home public land mobile network (HPLMN). As described above, NRF 100 may maintain profiles of available NF instances and their supported services and allow consumer NFs or SCPs to subscribe to and be notified of the registration of new/updated NF instances. SCP 101 may also support service discovery and selection of NF instances.

SCP 101 may perform load balancing of connections between consumer and producer NFs.

NRF 100 is a repository for profiles of NF instances. To communicate with a producer NF instance, a consumer NF or an SCP must obtain the NF profile of the producer NF instance from NRF 100. The NF profile is a JavaScript object notation (JSON) data structure defined in 3GPP TS 29.510. The NF profile includes attributes that indicate the types of services provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management function (UDM) 104 that manages user data, and an application function (AF) 106 that provides application services.

The NFs illustrated in FIG. 1 further include a session management function (SMF) 108 that manages sessions between an access and mobility management function (AMF) 110 and PCF 102. AMF 110 performs mobility management operations similar to those performed by a mobility management entity (MME) in 4G networks. An authentication server function (AUSF) 112 provides authentication services for user equipment (UEs), such as user equipment (UE) 114, seeking access to the network.

A network slice selection function (NSSF) 116 provides network slicing services for devices seeking to access specific network capabilities and characteristics associated with a network slice. NSSF 116 provides the NSSelection service, which allows NFs to request information about network slices and the NSSAIReachability service, which enables NFs to update and subscribe to receive notification of updates in network slice selection assistance information (NSSAI) reachability information.

A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a gNB (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

A SEPP 126 filters incoming traffic from another PLMN and can perform topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN. A SEPP filtering egress messages from consumer NFs in a PLMN is referred to as a consumer SEPP or C-SEPP. A SEPP that filters ingress messages directed to producer NFs in a PLMN is referred to as a producer SEPP or P-SEPP. A given SEPP can function as a C-SEPP and a P-SEPP, depending on the role the SEPP is performing.

A unified data repository (UDR) 128 stores subscription data for UEs. A binding support function (BSF) 130 manages bindings between PDU sessions and PCFs.

Figure 2:
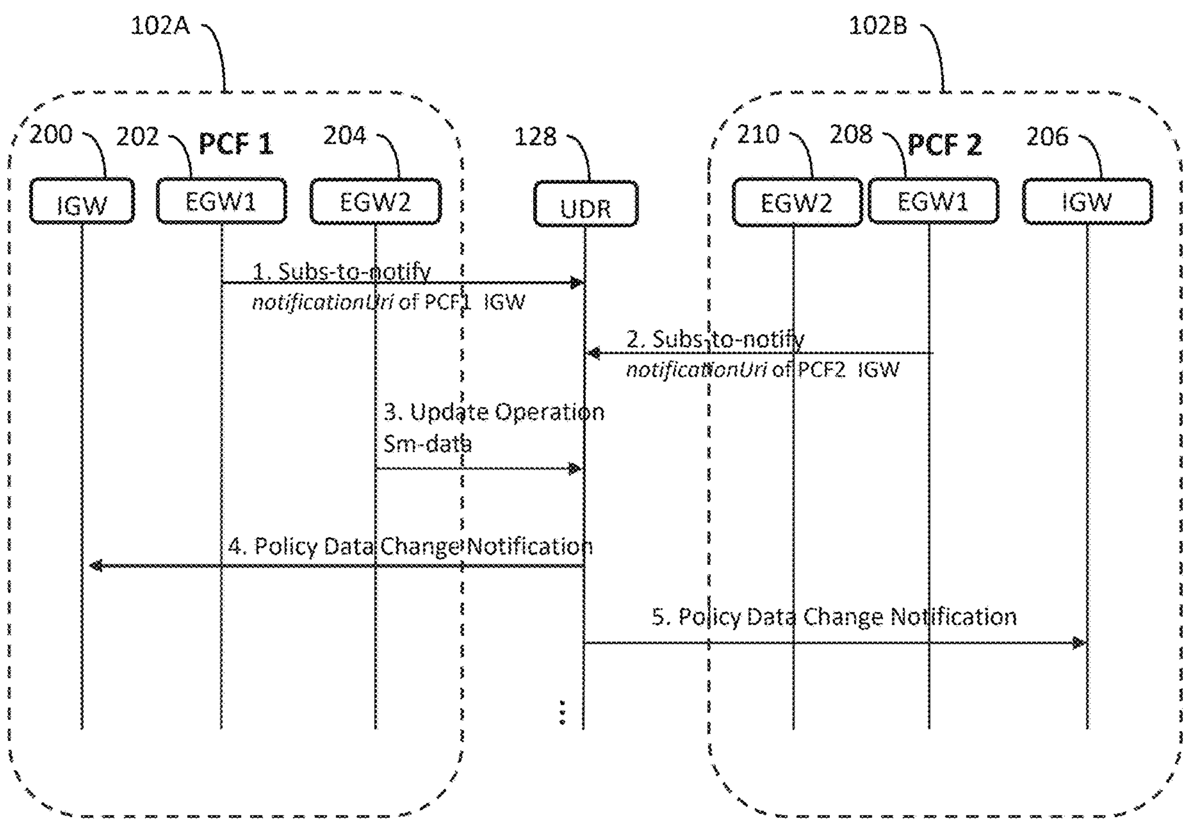
FIG. 2 is a message flow diagram illustrating a problem that can occur when a subscription notification request message is transmitted to a resource update originator.

As stated above, one issue in 5G, previous generation, and subsequent generation networks is that unnecessary notification request messages may be sent to resource update originators, especially in cloud network environments in which a consumer NF identifies an ingress gateway of the consumer NF as a notification target in a subscription request message and sends a resource update request message from an egress gateway of the consumer NF that has a different IP address and/or FQDN from that of the ingress gateway. FIG. 2 is a message flow diagram illustrating an exemplary cloud network architecture in which such problems can occur. Referring to FIG. 2, a PCF 102A may include an ingress gateway 200 and egress gateways 202 and 204. Similarly, a PCF 102B may also include an ingress gateway 206 and egress gateways 208 and 210. PCFs 102A and 102B may originate messages, such as subscription request messages and resource update request messages, which identify and/or originate from different endpoint gateways of PCFs 102A and 102B, and the different gateways may have different IP addresses and/or FQDNs, as illustrated in the following example illustrated in FIG. 2.

Referring to the message flow in FIG. 2, in step 1, PCF 102A subscribes with UDR 128 to receive a notification when an sm-data resource is modified by sending a subscription request message originating from egress gateway 202 of PCF 102A. The subscription request message includes a notification URI field with an authority part identifying ingress gateway 200 of PCF 102A as the originating endpoint and the target for notification request messages concerning updates to the subscription.

In step 2, PCF 102B subscribes with UDR 128 to receive a notification when an sm-data resource is modified by sending a subscription request message originating from egress gateway 208 of PCF 102B. The subscription request message includes a notification URI field with an authority part identifying ingress gateway 206 of PCF 102B as the originating endpoint and the target for notification request messages concerning updates to the subscription.

In step 3, PCF 102A transmits a resource update request message to UDR 128. The resource update request message identifies the same target sm-data resource for which the subscription was created in response to the subscription request message in step 1. The resource update request message originates from egress gateway 204 of PCF 102A. Hence, comparing the source IP address or the source FQDN of the resource update request message to the IP address or FQDN of ingress gateway 200 in the notification URI from the subscription request message will fail to detect that the resource update request message in step 3 originates from the same consumer NF, i.e., PCF 102A, as the subscription request message in step 1. Accordingly in step 4, a subscription notification request message including a policy data change notification is transmitted unnecessarily to PCF 102A. In step 5, a subscription notification request message including the policy data change notification is also transmitted to PCF 102B.

The subscription notification request message to PCF 102A in step 4 is unnecessary because PCF 102A is the originator of the resource update request message and does not need to be informed of an update that PCF 102A originated. If such unnecessary notifications are allowed to occur, PCF 102A may be required to include logic to handle and discard such notifications. Unnecessary notifications may burden the resources of consumer NFs, consume network bandwidth, and lead to data inconsistencies in the network.

Figure 3:
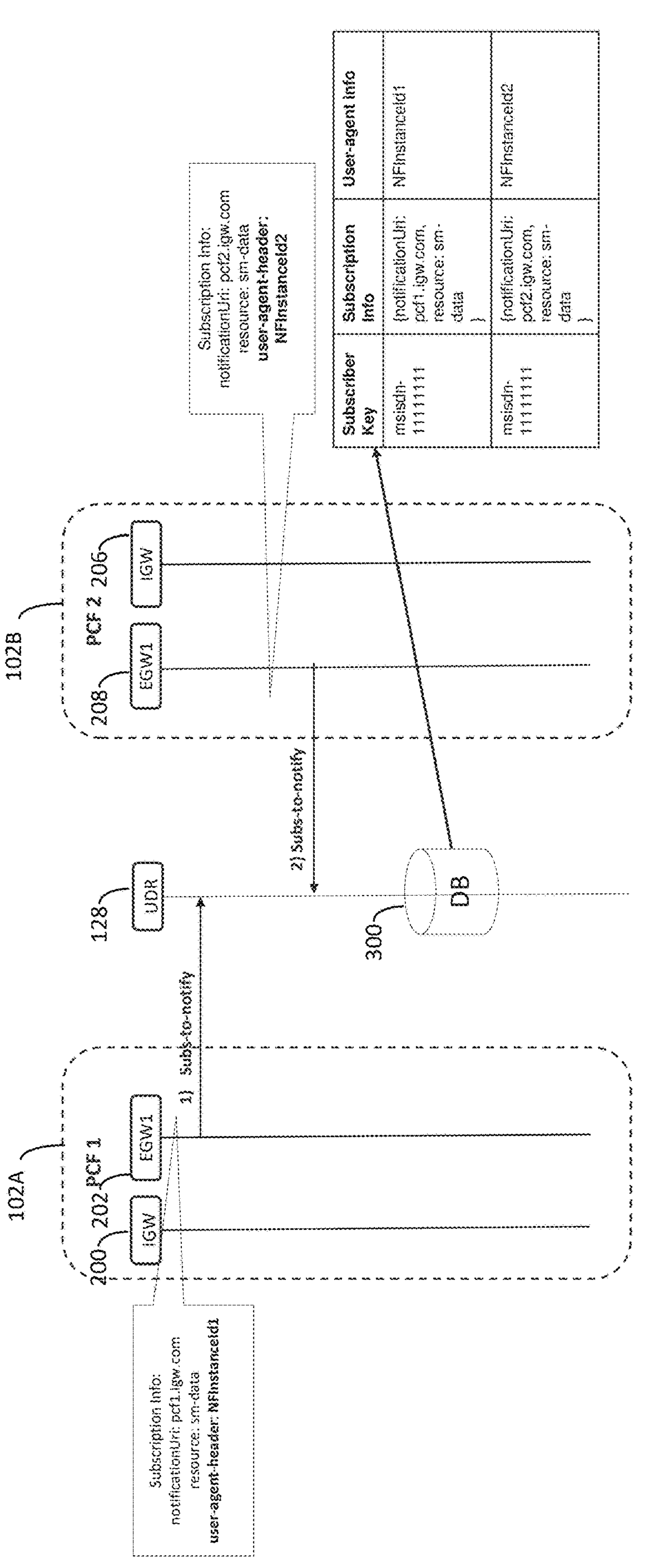
FIG. 3 is a message flow diagram illustrating the storing of consumer NF identifying information from a subscription request message in a subscription database.
Figure 4:
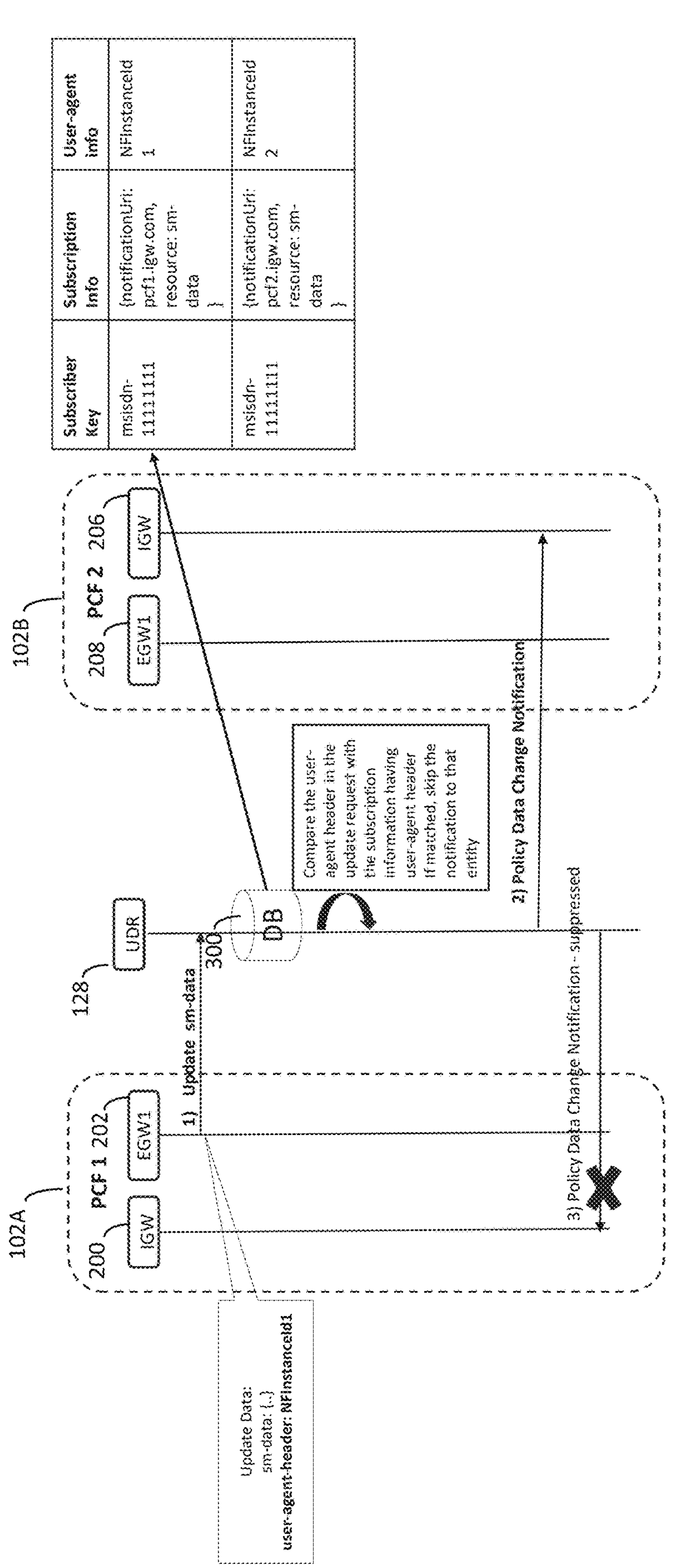
FIG. 4 is a message flow diagram illustrating the use of stored consumer NF identifying information in a subscription database to suppress transmission of a notification request message to a resource update originator.

To address the difficulties presented by the scenario illustrated in FIG. 2, a producer NF (such as UDR 128 illustrated in FIG. 2 or any other producer NF to which other NFs subscribe and send updates) may be configured to store and use consumer NF identifying information from subscription request messages and suppress transmission of subscription notification request messages to resource update originators. The solution is applicable to any NF that follows a subscribe-notify model and uses hypertext transfer protocol (HTTP)-based communication. FIG. 3 is a message flow diagram illustrating the storing of consumer NF identifying information from a subscription request message in a subscription database. The example in FIGS. 3 and 4 is specific to UDR-PCF interaction as defined in 3GPP TS 29.519. However, the same methodology can be used to suppress transmission of subscription request messages in other call flows, such as NRF-PCF, NRF-UDM, etc., where one of the NFs is functioning as the producer NF that receives the subscription request message and the resource update request and the other NF functions as the NF service consumer and originator of the subscription and resource update requests.

Referring to the message flow in FIG. 3, in step 1, PCF 102A sends a subscription request message to UDR 128. The subscription request message includes subscription information, including a notification URI, a resource identifier, and a user-agent header. The subscription information identifies the target resource of the subscription. The notification URI identifies ingress gateway 200 of PCF 102A, and the user-agent header includes the NF instance identifier of PCF 102A. In step 2, PCF 102B sends a subscription request message identifying the same target resource, a notification URI identifying ingress gateway 206 of PCF 102B and including a user-agent header carrying the NF instance ID of PCF 102B.

In step 3, UDR 128 receives the subscription request messages and creates a record for each subscription in a subscription database 300. The record for each subscription includes a subscriber key, subscription identifying information, and user agent information identifying the consumer NF. The subscriber key is a value identifying the communications network subscriber. In the illustrated example, the subscriber key is a mobile subscriber integrated services digital network (MSISDN) number. The subscription identifying information includes the notification URI for each subscription endpoint and the resource identifier. In the illustrated example, the notification URI for ingress gateway 200 of PCF 102A is pcf1.igw.com. The resource identifier is sm-data. The notification URI for PCF 102B is pcf2.igw.com, and the resource identifier is sm-data. The user agent information is obtained from the user-agent header of the subscription request message transmitted by PCF 102A is NFInstanceId1. The consumer NF identifying information obtained from the user-agent header of the subscription request message transmitted by PCF 102B is NFInstanceId2. The consumer NF identifying information may be used to suppress unnecessary subscription notification request messages, as will be described with respect to FIG. 4. In one example, the user-agent header included in the subscription notification request message may include the following details.

User-Agent: <NF Type>-<NF instance ID> <NF FQDN>
e.g.: SMF-54804518-4191-46b3-955c-ac631f953ed8 smf1.east.5gc.mnc012.mcc234.3gppnetwork.org In this example, the NF instance ID value from the user-agent header, i.e., 54804518-4191-46b3-955c-ac631f953ed8 may be stored in the subscription database record created by each subscribing consumer NF and used to suppress subscription notification request messages in response to resource update request messages from the same consumer NFs, even when the resource update request messages originate from an egress gateway of the consumer NF that is different from the subscription target identified in the notification URI.

FIG. 4 is a message flow diagram illustrating the use of stored consumer NF identifying information in a subscription database to suppress transmission of a subscription notification request message to a resource update originator. The message flow illustrated in FIG. 4 uses PCF-UDR interaction as defined in 3GPP TS 29.519 and enhances the message flow to suppress unintended notifications towards the same originator. In FIG. 4, it is assumed that UDR 128 has valid subscriptions from PCFs 102A and 102B created using the message flow illustrated in FIG. 3. It is also assumed that UDR 128 has added the NF instance IDs of PCFs 102A and 102B to the records in subscription database 300. Referring to the message flow in FIG. 4, in step 1, PCF 102A generates and transmits a resource update request message to UDR 128. The resource update request message identifies the same sm-data resource for which PCF 102A created a subscription using the subscription request message in step 1 of FIG. 3. UDR 128 receives the subscription request message, reads the resource identifier from the message, and uses the resource identifier to locate a record for the subscription in subscription database 300. In this example, UDR 128 locates the two records created for the subscriptions by PCF 102A and 102B. UDR 128 reads the NF instance ID of PCF 102A from the user-agent header of the resource update request message and compares the NF instance ID from the user-agent header of the resource update request message to the NF instance ID stored in the user agent info sub-record of each database record. The NF instance ID from the resource update request message matches the NF instance ID in the database record created for the subscription created by PCF 102A. Accordingly, UDR 128 refrains from transmitting or suppresses the transmission of the subscription notification request message to PCF 102A. UDR determines that the NF instance ID from the subscription notification request message does not match the NF instance ID for the database record in subscription database 300 created for the subscription for PCF 102B. Accordingly, in step 2, UDR 102B transmits a subscription notification request message to the notification URI in the record corresponding to PCF 102B. The suppression of the unnecessary notification to the notification URI corresponding to PCF 102A is illustrated by step 3 in FIG. 4. Thus, using the steps illustrated in FIG. 4, unnecessary notifications to resource update originators are suppressed.

Although the example illustrated in FIG. 4 is to process a resource update request message originating from an NF service consumer, the same methodology can be used to process notifications from a provisioning system. When a provisioning system updates a resource corresponding to one or more subscriptions in subscription database 300, the receiving NF service producer will locate records in subscription database 300 corresponding to the resource and send subscription notification request messages to the subscribing NFs because the message from the provisioning system will not contain an NF instance ID that matches any of the subscriptions. The producer NF will also not send a subscription notification request message to the provisioning system because there will not be a record in subscription database 300 that creates a subscription for the provisioning system.

Although the example illustrated in FIGS. 3 and 4 relates to PCF-UDR interactions, the same methodology can be used to suppress notifications to resource update originators where the resource update originator is any consumer NF that creates subscriptions and the producer NF is any producer NF that maintains subscriptions from other NFs. Other examples where a producer NF can suppress notifications from a resource update originator include an example where the resource update originator is a UDM and the producer NF is a UDR, where the resource update originator is an NEF and the producer NF is a UDR, and where the resource update originator is an NEF and the producer NF is a UDR, and where the resource update originator is an NEF and the producer NF is a UDM.

Figure 5:
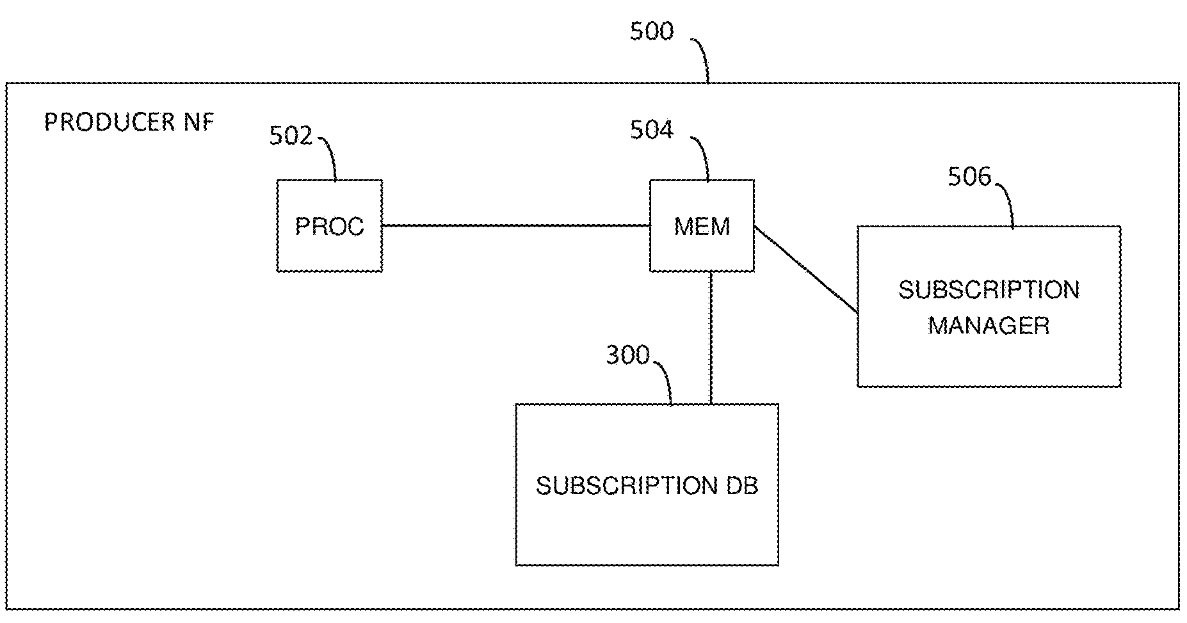
FIG. 5 is a block diagram illustrating an exemplary architecture of a producer NF for suppressing transmission of notification request messages to resource update originators.

FIG. 5 is a block diagram illustrating an exemplary architecture of a producer NF for suppressing transmission of subscription notification request messages to resource update originators. Referring to FIG. 5, a producer NF 500 includes at least one processor 502 and a memory 504. Producer NF 500 may be any suitable NF that can create subscriptions in response to subscription request messages and that can update the subscriptions and generate notifications in response to resource update requests, including, but not limited to the examples described herein. Producer NF 500 further includes subscription database 300 for storing the subscription data illustrated in FIGS. 3 and 4, including the consumer NF identification information usable to suppress unnecessary notifications. Producer NF 500 further includes a subscription manager 506 that performs the steps described herein for creating subscriptions in response to subscription request messages, updating subscriptions in response to resource update request messages, sending subscription notification request messages to subscribing NFs other than resource update originators, and suppressing transmission of subscription notification request messages to resource update originators. Subscription manager 506 may be implemented using computer executable instructions stored in memory 504 and executed by processor 502.

Figure 6:
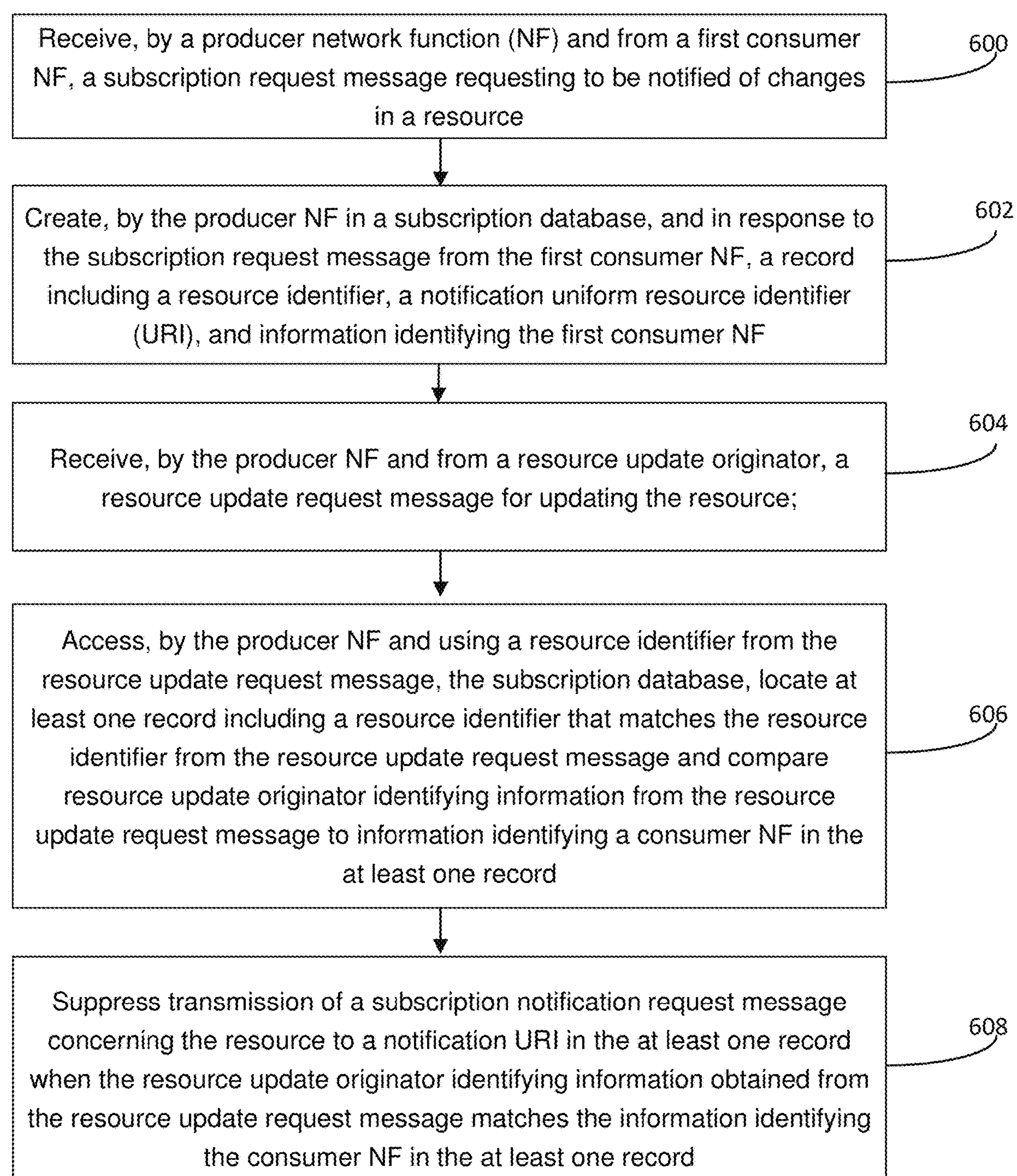
FIG. 6 is a flow chart illustrating an exemplary process for suppressing transmission of notification request messages to resource update originators.

FIG. 6 is a flow chart illustrating an exemplary process for suppressing transmission of subscription notification request messages to resource update originators. Referring to FIG. 6, in step 600, the process includes receiving, by a producer NF and from a first consumer NF, a subscription request message requesting to be notified of changes in a resource. For example, a consumer NF, such as PCFs 102A or 102B may send a subscription request message including information identifying a target resource and providing a notification URI at which the subscribing NF desires to be notified of updates to the resource.

In step 602, the process includes creating, by the producer NF in a subscription database, and in response to the subscription request message from the first consumer NF, a record including a resource identifier, a notification URI, and information identifying the first consumer NF. For example, a producer NF, such as UDR 128, may create, in subscription database 300 a record that includes the resource identifier and the notification URI from the subscription request message and an NF instance ID of the subscribing NF obtained from a user-agent header of the subscription request message.

In step 604, the process further includes receiving, by the producer NF and from a resource update originator, a resource update request message for updating the resource. For example, a consumer NF, such as PCF 102A or 102B, may generate and send a resource update request message to a producer NF, such as UDR 128, for updating the status of a resource maintained by UDR 128.

In step 606, the process further includes accessing, by the producer NF and using a resource identifier from the resource update request message, the subscription database, locating at least one record including a resource identifier that matches the resource identifier from the resource update request message and comparing resource update originator identifying information from the resource update request message to information identifying a consumer NF in the at least one record. For example, a producer NF, such as UDR 128, may use the resource identifier in the resource update request message to locate records in subscription database 300 having resource identifiers that match the resource identifier in the resource update request message. The producer NF may read the NF instance identifier from the user-agent header of the resource update request message and compare the NF instance identifier to the NF instance identifiers in each of the matching records.

In step 608, the process includes suppressing transmission of a subscription notification request message concerning the resource to a notification URI in the at least one record when the resource update originator identifying information obtained from the resource update request message matches the information identifying the consumer NF in the at least one record. For example, for records corresponding to the resource being updated where the NF instance identifier in the record matches the NF instance identifier in the resource update request message, the producer NF may suppress transmission of a subscription notification request message to the notification URI in the record. For records where the NF instance identifier in the record does not match the NF instance identifier in the resource update request message, the producer NF may transmit a subscription notification request message to the notification URI in the record.

Exemplary advantages of the subject matter described herein include reducing wasting of network bandwidth caused by transmission of unnecessary subscription notification request messages. Another advantage is conservation of processing resources of subscribing NFs by avoiding the need to implement logic to process unnecessary subscription notification request messages. The use of information from the user-agent header to avoid the transmission and processing of unnecessary subscription notification request messages is also advantageous because the user-agent header in subscription notification request message and resource update request messages is supported by 3GPP standards. Therefore, the need for custom headers to carry information used to identify and avoid unnecessary subscription notifications is reduced.

The disclosure of each of the following references is hereby incorporated herein by reference in its entirety.

REFERENCES 1. 3rd Generation Partnership Project; Technical Specification Group Services and System Aspects; Procedures for the 5G System (5GS); Stage 2 (Release 18) 3GPP TS 23.502 V18.6.0 (2024-06)
2. 3rd Generation Partnership Project; Technical Specification Group Services and System Aspects; System architecture for the 5G System (5GS); Stage 2 (Release 19) 3GPP TS 23.501 V19.0.0 (2024-06)

3. 3rd Generation Partnership Project; Technical Specification Group Core Network and Terminals; 5G System; Technical Realization of Service Based Architecture; Stage 3 (Release 18) 3GPP TS 29.500 V18.6.0 (2024-06)
4. 3rd Generation Partnership Project; Technical Specification Group Core Network and Terminals; 5G System; Principles and Guidelines for Services Definition; Stage 3 (Release 18) 3GPP TS 29.501 V18.5.0 (2024-06)
5. 3rd Generation Partnership Project; Technical Specification Group Core Network and Terminals; 5G System; Network Function Repository Services; Stage 3 (Release 18) 3GPP TS 29.510 V18.7.0 (2024-06)
6. 3rd Generation Partnership Project; Technical Specification Group Core Network and Terminals; 5G System; Usage of the Unified Data Repository service for Policy Data, Application Data, and Structured Data for Exposure; Stage 3 (Release 18) 3GPP TS 29.519 V18.6.0 (2024-06)

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for suppressing subscription notifications to resource update originators, the method comprising:

receiving, by a producer network function (NF) and from a first consumer NF, a subscription request message requesting to be notified of changes in a resource;

creating, by the producer NF in a subscription database, and in response to the subscription request message from the first consumer NF, a record including a resource identifier, a notification uniform resource identifier (URI), and information identifying the first consumer NF;

receiving, by the producer NF and from a resource update originator, a resource update request message for updating the resource;

accessing, by the producer NF and using a resource identifier from the resource update request message, the subscription database, locating at least one record including a resource identifier that matches the resource identifier from the resource update request message and comparing resource update originator identifying information from the resource update request message to information identifying a consumer NF in the at least one record; and suppressing transmission of a subscription notification request message concerning the resource to a notification URI in the at least one record when the resource update originator identifying information obtained from the resource update request message matches the information identifying the consumer NF in the at least one record.

2. The method of claim 1 wherein creating the record including the information identifying the first consumer NF includes reading an NF instance identifier of the first consumer NF from a user-agent header of the resource update request message and storing the NF instance identifier of the first consumer NF in the record.

3. The method of claim 2 wherein locating at least one record includes locating the record created in response to the subscription request message from the first consumer NF.

4. The method of claim 3 wherein comparing the resource update originator identifying information from the resource update request message to the information identifying the consumer NF from the at least one record includes comparing an NF instance identifier of the resource update originator read from a user-agent header of the resource update request message to the NF instance identifier of the first consumer NF stored in the record.

5. The method of claim 4 wherein suppressing transmission of the subscription notification request message concerning the resource to the resource update originator includes suppressing the transmission of the subscription notification request message to the resource update originator when the NF instance identifier of the resource update originator read from the user-agent header of the resource update request message matches the NF instance identifier of the first consumer NF stored in the record.

6. The method of claim 1 comprising:

receiving, by the producer NF and from a second consumer NF, a subscription request message requesting to be notified of changes in the resource;

creating, by the producer NF, in the subscription database, and in response to the subscription request message from the second consumer NF, a record including the resource identifier, a notification URI, and information identifying the second consumer NF.

7. The method of claim 6 wherein locating at least one record includes locating the record that was created in response to the subscription request message from the second consumer NF and comparing the resource update originator identifying information from the resource update request message to the information identifying the consumer NF from the at least one record includes comparing an NF instance identifier of the resource update originator read from a user-agent header of the resource update request message to the NF instance identifier of the second consumer NF stored in the record created in response to the subscription request message from the second consumer NF.

8. The method of claim 7 comprising transmitting the subscription notification request message to the notification URI in the record created in response to the subscription request message from the second consumer NF when the NF instance identifier read from the user-agent header of the subscription update request message does not match the NF instance identifier of the second consumer NF stored in the record created in response to the subscription request message from the second consumer NF.

9. The method of claim 1 wherein the notification URI in the record created in response to the subscription request message from the first consumer NF identifies a notification target of the first consumer NF having a different Internet protocol (IP) address or fully qualified domain name (FQDN) from an IP address or an FQDN of the resource update originator.

10. The method of claim 9 wherein the notification target comprises an ingress gateway of the first consumer NF and the resource update originator comprises an egress gateway of the first consumer NF.

11. A system for suppressing subscription notifications to resource update originators, the system comprising:

a producer network function including at least one processor and a memory; and a subscription manager implemented by the at least one processor for receiving, from a first consumer NF, a subscription request message requesting to be notified of changes in a resource, creating, in a subscription database, and in response to the subscription request message from the first consumer NF, a record including a resource identifier, a notification uniform resource identifier (URI), and information identifying the first consumer NF, receiving, from a resource update originator, a resource update request message for updating the resource, accessing, using a resource identifier from the resource update request message, the subscription database, locating at least one record including a resource identifier that matches the resource identifier from the resource update request message and comparing resource update originator identifying information from the resource update request message to information identifying a consumer NF in the at least one record, and suppressing transmission of a subscription notification request message concerning the resource to a notification URI in the at least one record when the resource update originator identifying information obtained from the resource update request message matches the information identifying the consumer NF in the at least one record.

12. The system of claim 11 wherein the subscription manager is configured to create the record including the information identifying the first consumer NF by reading an NF instance identifier of the first consumer NF from a user-agent header of the resource update request message and storing the NF instance identifier of the first consumer NF in the record.

13. The system of claim 12 wherein the subscription manager is configured to locate the record created in response to the subscription request message from the first consumer NF.

14. The system of claim 13 wherein the subscription manager is configured to compare the resource update originator identifying information from the resource update request message to the information identifying the consumer NF from the at least one record by comparing an NF instance identifier of the resource update originator read from a user-agent header of the resource update request message to the NF instance identifier of the first consumer NF stored in the record.

15. The system of claim 14 wherein the subscription manager is configured to suppress transmission of the subscription notification request message concerning the resource to the resource update originator by suppressing the transmission of the subscription notification request message to the resource update originator when the NF instance identifier of the resource update originator read from the user-agent header of the resource update request message matches the NF instance identifier of the first consumer NF stored in the record.

16. The system of claim 11 wherein the subscription manager is configured to receive, from a second consumer NF, a subscription request message requesting to be notified of changes in the resource;

create, in the subscription database and in response to the subscription request message from the second consumer NF, a record including the resource identifier, a notification URI, and information identifying the second consumer NF.

17. The system of claim 16 wherein the subscription manager is configured to locate the record created in response to the subscription request message from the second consumer NF and compare the resource update originator identifying information from the resource update request message to the information identifying the consumer NF from the at least one record includes comparing an NF instance identifier of the resource update originator read from a user-agent header of the resource update request message to the NF instance identifier of the second consumer NF stored in the record created in response to the subscription request message from the second consumer NF.

18. The system of claim 17 wherein the subscription manager is configured to transmit the subscription notification request message to the notification URI in the record created in response to the subscription request message from the second consumer NF when the NF instance identifier read from the user-agent header of the subscription update request message does not match the NF instance identifier of the second consumer NF stored in the record created in response to the subscription request message from the second consumer NF.

19. The system of claim 11 wherein the notification URI in the record created in response to the subscription request message from the first consumer NF identifies a notification target of the first consumer NF having a different Internet protocol (IP) address or fully qualified domain name (FQDN) from an IP address or an FQDN of the resource update originator, the notification target comprises an ingress gateway of the first consumer NF, and the resource update originator comprises an egress gateway of the first consumer NF.

20. A non-transitory computer readable medium having stored thereon executable instructions that when executed by a processor of a computer control the computer to perform steps comprising:

receiving, by a producer network function (NF) and from a first consumer NF, a subscription request message requesting to be notified of changes in a resource;

creating, by the producer NF in a subscription database, and in response to the subscription request message from the first consumer NF, a record including a resource identifier, a notification uniform resource identifier (URI), and information identifying the first consumer NF;

receiving, by the producer NF and from a resource update originator, a resource update request message for updating the resource; accessing, by the producer NF and using a resource identifier from the resource update request message, the subscription database, locating at least one record including a resource identifier that matches the resource identifier from the resource update request message and comparing resource update originator identifying information from the resource update request message to information identifying a consumer NF in the at least one record; and suppressing transmission of a subscription notification request message concerning the resource to a notification URI in the at least one record when the resource update originator identifying information obtained from the resource update request message matches the information identifying the consumer NF in the at least one record.

* * * * *